Patented Mar. 15, 1949

2,464,247

UNITED STATES PATENT OFFICE 2,464,247

PREPARATION OF GUANIDINE SULFATES

Johnstone S. Mackay, Old Greenwich, Conn., assignor to American Cyanamid Company, New York, N. Y., a corporation of Maine No Drawing. Application January 3, 1947, Serial No. 720,104

10 Claims. (Cl. 260—564)

The present invention relates to the production of guanidine values and more particularly to a new method whereby such values may be provided in the form of guanidine sulfates.

An object of the present invention is to provide guanidine values and more specifically guanidine sulfates at low cost by a new process employing cheap reactants and simple apparatus and procedures.

Another object of the present invention is to provide guanidine values employing urea as a starting material in a process avoiding the use of superatmospheric pressures of ammonia and expensive catalysts and dehydrating agents.

Other objects will be apparent from the discussion that follows hereinafter.

Heretofore, the practical methods for the production of unsubstituted guanidine salts were restricted to the use of cyanamide, guanylurea, dicyandiamide, and ammonium thiocyanate as starting materials. Attempts to use the cheaper urea as a starting material were not successful, particularly from the standpoint of adaptability to large scale production. In one attempt, urea was ammonolyzed at highly elevated temperatures and pressures of ammonia. An unfavorable equilibrium, a low rate of reaction and a side-reaction between the product and the water formed in the reaction resulted in long periods of reaction being required to obtain low yields. In another atempt to employ urea the difficulties inherent in the first process were attemptedly overcome by employing certain metallic catalysts and dehydrating agents. In spite of the use of such expensive accelerators and dehydrating agents periods of reaction of the order of 5–8 hours were still required to obtain low yields of the guanidine salts.

It has now been found that urea may be used in the preparation of a guanidine salt without having to resort to high pressures of ammonia, expensive catalysts and dehydrating agents and yet employ shorter periods of reaction than those used in the past to obtain highly satisfactory yields. This is achieved by reacting urea with sulfamic acid or a salt thereof. Such salts may be metallic salts, as, for example, the ammonium, aluminum, potassium, sodium, barium, calcium, magnesium and like salts, and also sulfamic acid addition salts of the amines of the aliphatic, carbocyclic and heterocyclic series, such as, for example, the methylamine, diethylamine, di-n-dodecylamine, aniline, morpholine sulfamates and the like. Sulfamic acid, i. e., hydrogen sulfamate, and the various metallic and amine sulfamates are hereinafter referred to in the specification and in the claims as "sulfamates."

In general the reaction is carried out by simply fusing the reactants and thereafter heating to a suitable temperature for a short period of time to permit the reaction to occur. Thereafter, the reaction mixture is cooled, extracted with water to obtain an aqueous solution of guanidine sulfate from which the same or the free guanidine or other guanidine salts may be isolated by conventional procedures detailed more fully hereinafter. While the reaction is most conveniently carried out by fusion of the reactants, the use of suitable solvents and/or diluents, such as the high boiling amines, N-isoamylaniline, di-N-amylamine, the hydrocarbons, tetralin, -methylnaphthalene, the nitriles, m-tolunitrile, cinnamonitrile, glutaronitrile and other inert materials is also permissible. However, such materials generally provide no advantage and aside from the expense imposed by their use there is sometimes the problem of separating the desired guanidine salts therefrom.

While the reaction may be carried out over a wide range of temperatures, it is preferred to employ a temperature within the range of substantially 190°–300° C., and more preferably a temperature within the range of substantially 210°–250° C. At temperatures substantially below 190° C. the reaction progresses somewhat slowly making the use of such temperatures somewhat impractical, wh eas at the temperatures substantially above 300° C. decomposition of the desired guanidine sulfates begins to become appreciable. It is particularly surprising to find that the reaction may be carried out at temperatures as elevated as these in the absence of superatmospheric pressures of ammonia since heretofore it was always the view that very high pressures of ammonia were required to stabilize the urea to a sufficient extent to permit such high temperatures to be reached without decomposing the urea. Apparently, the sulfamates stabilize the urea against thermal decomposition thus permitting the present process to be carried out at elevated temperatures without any appreciable urea decomposition. In this connection, the sulfamic acid, ammonium and sodium sulfamates are preferred because of their superior stabilizing ability.

The following specific examples are set forth below to more particularly describe the process of the present invention.

Example 1

A mixture of 300 g. of urea and 1140 g. of ammonium sulfamate was fused in an oil bath to provide a clear melt at a temperature of about 90° C. Thereafter, the temperature was gradually raised to 225° C. with no appreciable amount of decomposition, i. e., there was no evolution of gas. At the aforementioned 225° C. a rapid exothermic reaction began to occur so that despite removal of the heat source the temperature of the reaction mixture rose to 245° C. After about 30 minutes the reaction mixture had set up to a solid mass and the reaction was apparently over. The solid was then cooled, ground and leached with water to obtain 388 g. of guanidine sulfate of 70% of theory.

Example 2

A mixture of 600 g. of urea and 2280 g. of ammonium sulfamate was heated to provide a fused mixture, said fusion occuring at about 90° C. By continued heating the temperature was raised to about 230° C. at which temperature an exothermic reaction began to occur. As a result of the exothermic character of the reaction the temperature rose to 265° C. and was maintained there for about 1 hour. At the end of this time the material had solidified to a clear, glasslike solid. As before, the solid was cooled, ground and leached with water to obtain 500 g. of guanidine sulfate or a yield of 46.3% of theory.

Example 3

60 g. of urea were first fused and thereafter 97 g. of sulfamic acid were added slowly to the melt. After raising the temperature to 210° C. an exothermic reaction occurred. After about 15 minutes the exothermic tendencies had dissipated but the reaction mixture was maintained at about 210° C. by the application of heat for an additional 1¾ hours. Thereafter, the mixture was cooled, ground, and leached with water to obtain 38.5 g. of guanidine sulfate or 35% of theory.

Example 4

Sodium sulfamate was prepared by dissolving 97 g. of sulfamic acid in 300 cc. of water and thereafter adding 40 g. of sodium hydroxide. The sodium sulfamate was precipitated from solution by the slow addition of 150 cc. of ethanol. 20 g. of urea and 46 g. of sodium sulfamate were heated to 210° C. in an oil bath. The resultant fused mixture began to set up solid within a few minutes. After cooling the solid reaction mixture, the same was ground somewhat and leached with water to obtain a mixture of guanidine sulfates equivalent to 4.6 g. of guanidine.

Example 5

A mixture of 40 g. of urea and 80 g. of calcium sulfamate was heated to effect fusion and thereafter the temperature was raised to 230° C. After a period of a few minutes the reaction mixture became solid and on cooling it was ground and leached to extract the guanidine sulfate. The solution of the guanidine sulfate was treated with picric acid to precipitate guanidine values as guanidine picrate which was removed by filtration and dried. The amount of such salt thus obtained was the equivalent of 5.4 g. of guanidine or 24% of theory.

The calcium sulfamate was prepared by dissolving 97 g. of sulfamic acid in 700 cc. of water and thereafter adding 55 g. of calcium hydroxide with stirring. The stirring was continued for about 1 hour and the excess undissolved calcium hydroxide was removed by filtration. To the clear filtrate resulting therefrom were added 1400 cc. of ethanol to precipitate the calcium sulfamate which was then dried and used as indicated above.

Example 6

Dodecylamine sulfamate was prepared by dissolving 97 g. of sulfamic acid in 1 l. of methanol and thereafter adding 185 g. of dodecylamine with stirring. After stirring for about 1 hour the dodecylamine addition salt of sulfamic acid began to precipitate as a fine white powder. After an additional hour of stirring the precipitation of the amine salt was considered complete, the salt was removed by filtration and air-dried for 48 hours.

A mixture of 30 g. of urea and 141 g. of dodecylamine sulfamate was fused, the temperature raised to 230° C. and maintained there for 15 minutes. Thereafter, the reaction mixture was cooled and the resultant waxy mass was shaved into ribbons for extraction with water. The aqueous extract of this material contained an amount of guanidine sulfate equivalent to 9.54 g. of guanidine or 32% of theory.

Experiments have shown that while widely varying ratios of the two reactants may be employed, the use of substantially 1 mol of urea to substantially ½–3 mols of sulfamate is preferred. The use of higher proportions of the sulfamate results in somewhat higher yields of guanidine values but such increased yields are not sufficiently great to offset the cost of using the additional sulfamate. Because of such economic considerations the guanidine sulfate usually provided by the process of the present invention is predominantly in the form of the diguanidine sulfate. Obviously, the more acidic monoguanidine sulfate may be readily prepared therefrom by acidifying an aqueous solution of the diguanidine sulfate with sulfuric acid. In general, at a pH of about 2 the salt is predominantly in the form of the monoguanidine sulfate, whereas at a pH of about 7 the sulfate is predominantly in the form of the diguanidine sulfate.

The isolation of the guanidine sulfate may be effected by any of the conventional means such as by cooling or evaporating to cause crystallization or by adding a water-miscible organic liquid such as ethanol to decrease the solubility of the salt and cause its precipitation. Because of the appreciable solubility of the sulfate, the latter technique is usually resorted to despite the cost of the alcohol. The guanidine molecule being that desired, said guanidine values can also be isolated by forming a less soluble salt, such as a picrate, a carbonate, or a phosphate. The preparation of such less soluble salts is effected by simply adding an equivalent amount of the corresponding acid to the aqueous solution of the sulfate and inducing crystallization by any conventional means such as those aforementioned.

The guanidine values may also be covered as free guanidine by dissolving the dry reaction mixture in an alcohol such as ethanol, adding an excess of potassium hydroxide to precipitate the sulfate ion as potassium sulfate and thus provide an alcoholic solution of the free base. Such free guanidine may be isolated from solution, if desired, by conventional procedures although generally some difficulty is experienced in applying the usual methods for inducing crystallization to the isolation of the guanidine.

The guanidine sulfates provided by the process of the present invention are valuable chemicals being useful as fire-proofing agents, in the preparation of resins and blueprint materials and as intermediates in the preparation of chemotherapeutic agents, pharmaceuticals, surface active agents, and the like.

While the invention has been described with particular reference to specific embodiments, it is to be understood that it is not to be limited thereto but is to be construed broadly and restricted solely by the scope of the appended claims.

What is claimed is:

1. A process of preparing a guanidine sulfate comprising reacting urea with a member of the group consisting of sulfamic acid and a salt thereof to form a guanidine sulfate and recovering the same from the reaction mass.

2. A process of preparing a guanidine sulfate comprising reacting urea with a member of the group consisting of sulfamic acid and a salt thereof at a temperature within the range of substantially 190°–300° C.

3. A process of preparing a guanidine sulfate comprising reacting urea with a member of the group consisting of sulfamic acid and a salt thereof at a temperature within the range of substantially 210°–250° C.

4. A process of preparing a guanidine sulfate comprising reacting urea with a member of the group consisting of sulfamic acid and a salt thereof at a temperature within the range of substantially 190°–300° C. in a ratio of substantially 1 mol of urea to substantially ½–3 mols of the sulfamate.

5. A process of preparing a guanidine sulfate comprising reacting urea with a member of the group consisting of sulfamic acid and a salt thereof at a temperature within the range of substantially 210°–250° C. in a ratio of substantially 1 mol of urea to substantially ½–3 mols of the sulfamate.

6. A process of preparing a guanidine sulfate comprising fusing substantially 1 mol of urea with substantially ½–3 mols of a member of the group consisting of sulfamic acid and a salt thereof at a temperature within the range of substantially 190°–300° C.

7. A process of preparing a guanidine sulfate comprising fusing substantially 1 mol of urea with substantially ½–3 mols of a member of the group consisting of sulfamic acid and a salt thereof at a temperature within the range of substantially 210°–250° C.

8. A process of preparing a guanidine sulfate comprising fusing substantially 1 mol of urea with substantially ½–3 mols of sulfamic acid at a temperature within the range of substantially 210°–250° C.

9. A process of preparing a guanidine sulfate comprising fusing substantially 1 mol of urea with substantially ½–3 mols of ammonium sulfamate at a temperature within the range of substantially 210°–250° C.

10. A process of preparing a guanidine sulfate comprising fusing substantially 1 mol of urea with substantially ½–3 mols of sodium sulfamate at a temperature within the range of substantially 210°–250° C.

JOHNSTONE S. MACKAY.

REFERENCES CITED

The following references are of record in the file of this patent:

UNITED STATES PATENTS

| Number | Name | Date |
| --- | --- | --- |
| 2,109,952 | Wyler | Mar. 1, 1938 |
| 2,265,942 | Hill | Dec. 9, 1941 |
| 2,273,940 | Dimroth et al. | Feb. 24, 1942 |